US005900169A

United States Patent [19]

Borowy et al.

[11] Patent Number: 5,900,169

[45] Date of Patent: May 4, 1999

[54] SAFETY CIRCUIT FOR A BLOW FORWARD CONTACT START PLASMA ARC TORCH

[75] Inventors: Dennis Borowy, Hanover; Jon Lindsay, West Lebanon, both of N.H.

[73] Assignee: Hypertherm, Inc., Hanover, N.H.

[21] Appl. No.: 08/870,476

[22] Filed: Jun. 6, 1997

[51] Int. Cl.[6] .......... B23K 10/00

[52] U.S. Cl. .......... 219/121.57; 219/121.54; 219/124.02; 219/130.33; 219/121.59

[58] Field of Search .......... 219/121.54, 121.55, 219/121.56, 121.57, 121.39, 121.44, 121.59, 75, 124.01, 124.02, 130.21, 130.33

[56] References Cited

U.S. PATENT DOCUMENTS

| | | | |
|---|---|---|---|
| 3,558,973 | 1/1971 | Pochert et al. | 315/111 |
| 4,035,603 | 7/1977 | Fernicola | 219/121 |
| 4,041,272 | 8/1977 | Burton et al. | 219/89 |
| 4,151,396 | 4/1979 | Veal | 219/131 |
| 4,203,022 | 5/1980 | Couch, Jr. et al. | 219/121 |
| 4,330,700 | 5/1982 | Jagieniak et al. | 219/121 |
| 4,580,032 | 4/1986 | Carkhuff | 219/121 |
| 4,663,512 | 5/1987 | Kneeland et al. | 219/121 |
| 4,678,888 | 7/1987 | Camacho et al. | 219/121 |
| 4,814,577 | 3/1989 | Dallavalle et al. | 219/121 |
| 4,839,499 | 6/1989 | Kotecki et al. | 219/121 |
| 4,996,407 | 2/1991 | Traxler | 219/121.54 |
| 5,036,176 | 7/1991 | Yamaguchi et al. | 219/121.55 |
| 5,170,030 | 12/1992 | Solley et al. | 219/121.54 |
| 5,225,658 | 7/1993 | Yamaguchi et al. | 219/121.57 |
| 5,296,665 | 3/1994 | Peterson et al. | 219/121.57 |
| 5,416,297 | 5/1995 | Luo et al. | 219/121.57 |
| 5,521,350 | 5/1996 | Nishi et al. | 219/121.56 |
| 5,530,220 | 6/1996 | Tatham | 219/121.57 |
| 5,620,617 | 5/1997 | Borowy et al. . | |
| 5,643,475 | 7/1997 | Karino et al. | 219/121.57 |

FOREIGN PATENT DOCUMENTS

| | | |
|---|---|---|
| 0 144 267 | 6/1985 | European Pat. Off. . |
| 0 213 689 | 3/1987 | European Pat. Off. . |
| 0 259 270 | 3/1988 | European Pat. Off. . |
| 0 490 882 | 6/1992 | European Pat. Off. . |
| 64-234117 | 9/1989 | Japan . |
| 2-86799 | 3/1990 | Japan . |

*Primary Examiner*—Mark H. Paschall
*Attorney, Agent, or Firm*—Testa, Hurwitz & Thibeault, LLP

[57] ABSTRACT

A safety circuit is utilized in a blow forward contact start plasma arc torch to extinguish the current to the torch upon determination of an unsafe operating condition. The torch includes a torch body, an electrode and a translatable conductive nozzle biased into contact with the electrode. The safety circuit receives a reference signal a signal indicative of the arc voltage and a mode status signal. The torch current is extinguished when the signal indicative of the arc voltage is less than the reference signal and the mode status signal indicates the torch is operating in the transferred arc mode.

20 Claims, 3 Drawing Sheets

SAFETY CIRCUIT FOR A BLOW FORWARD CONTACT START PLASMA ARC TORCH

FIELD OF THE INVENTION

The present invention relates generally to plasma arc torches and methods of operation, and more specifically, to a safety circuit for a blow forward contact start plasma arc torch.

BACKGROUND OF THE INVENTION

Plasma arc torches are widely used in the cutting of metallic materials. A plasma arc torch generally includes a torch body, an electrode mounted within the body, a nozzle with a central exit orifice, electrical connections, passages for cooling and arc control fluids, a swirl ring to control the fluid flow patterns, and a power supply. The torch produces a plasma arc, which is a constricted ionized jet of a plasma gas with high temperature and high momentum. Gases used in the torch can be non-reactive (e.g. argon or nitrogen), or reactive (e.g. oxygen or air).

In operation, a pilot arc is first generated between the electrode (cathode) and the nozzle (anode). The pilot arc ionizes gas passing through the nozzle exit orifice. After the ionized gas reduces the electrical resistance between the electrode and the workpiece, the arc transfers from the nozzle to the workpiece. The torch may be operated in this transferred plasma arc mode, which is characterized by the conductive flow of ionized gas from the electrode to the workpiece, for the cutting of the workpiece.

Contact starting is one known technique for generating the pilot plasma arc. Contact starting is advantageous because it does not require high frequency equipment and does not generate electromagnetic interference. In one form of contact starting, the electrode is manually placed into electrical connection with the workpiece. A current is then passed from the electrode to the workpiece and the arc is struck by manually backing the electrode away from the workpiece.

Improvements in plasma arc torch systems have been developed which have eliminated the need to strike the torch against the workpiece in order to initiate an arc, thereby avoiding damage to brittle torch components. One such system is disclosed in U.S. Pat. No. 4,791,268 ("the '268 patent"), which is assigned to the same assignee as the instant application. The '268 patent describes a torch having a movable electrode and a stationary nozzle. A spring coupled to the electrode causes it to initially contact the nozzle such that the nozzle orifice is blocked. To start the torch, current is passed through the electrode and nozzle while a plasma gas is supplied to a plasma chamber defined by the electrode, the nozzle, and the swirl ring. Contact starting is achieved when the buildup of gas pressure in the plasma chamber overcomes the spring force, separating the electrode from the nozzle and drawing a low energy pilot arc therebetween. Thereafter, by bringing the nozzle into close proximity with the workpiece, the arc may be transferred to the workpiece with control circuitry increasing electrical parameters to provide sufficient energy for processing the workpiece. Plasma arc torch systems manufactured according to this design have enjoyed widespread acceptance in commercial and industrial applications.

SUMMARY OF THE INVENTION

A blow forward contact start plasma arc torch has been developed which is useful in a wide variety of industrial and commercial applications including, but not limited to, cutting and marking of metallic workpieces, and plasma spray coating. The torch includes a torch body in which an electrode is mounted fixedly. A translatable nozzle is mounted coaxially with the electrode forming a plasma chamber therebetween. The nozzle is resiliently biased into contact with the electrode by a spring element. A retaining cap is attached to the torch body to capture and position the nozzle. In one embodiment, the spring element is a separate component. In another embodiment, the spring element is attached to the component, forming an integral assembly. A power supply provides current for operating the torch in a pilot arc mode or a transferred arc mode. The details of blow forward contact start plasma arc torches are described in copending U.S. patent application, Ser. No. 08/727,028, which is assigned to the same assignee as the instant application.

During operation of a blow forward contact start plasma arc torch in the transferred arc mode, the torch can be moved so that the exposed nozzle strikes the workpiece. If the nozzle strikes the workpiece with enough force for the nozzle to contact the electrode, the arc is extinguished yet the power supply continues to provide the operating current to the torch. If the torch is thereafter moved away from the workpiece, the transferred arc is reestablished between the electrode and the workpiece. This condition can occur without knowledge of the operator and at high torch current levels. The unexpected resumption of the arc at potentially high current levels can create electrical and bum hazards.

The present invention is useful in preventing the unexpected resumption of the transferred arc during operation of a blow forward contact start plasma arc torch when the exposed nozzle is withdrawn from contact with the workpiece. The invention features a safety circuit for a blow forward contact start plasma arc torch. The safety circuit extinguishes the torch current when the nozzle is forced into electrical contact with the electrode during operation of the torch in the transferred arc mode. The safety circuit receives a reference signal, a signal indicative of the voltage across the transferred arc, and a mode status signal from control electronics within the power supply.

The reference signal, the signal indicative of the voltage across the transferred arc, and the mode status signal can be voltages. More specifically, the reference signal is a fixed value representing the minimum typical voltage between the electrode and the workpiece. The signal indicative of the voltage across the transferred arc is a voltage that corresponds to the actual voltage between the electrode and the workpiece during operation of the torch. In one embodiment, this voltage is linearly proportional to the actual voltage between the electrode and workpiece. The mode status signal is a voltage indicating whether the torch is operating in pilot arc mode or transferred arc mode.

In one embodiment, the safety circuit can include a comparator, a logic device and a control device. The comparator generates an output signal when the signal indicative of the transferred arc voltage is less than the reference signal. The logic device receives the comparator output signal and the mode status signal. The logic device has an output which indicates that an unsafe condition exists. The unsafe condition is defined by operation of the torch in the transferred arc mode and the signal indicative of the transferred arc voltage being less than the reference signal.

The output of the logic device is received by the control device which provides an output signal to the control electronics indicating an unsafe condition. The control device output is used by the control electronics to terminate the torch current. By eliminating the torch current, the invention serves to prevent the unsafe condition during which the transferred arc could otherwise be reestablished between the torch and the workpiece.

The invention also features a method for safe operation of a blow forward contact start plasma arc torch. The method includes providing a torch comprising an electrode, a translatable component and a power source that supplies current to the torch for operation in the pilot arc mode or transferred arc mode. A reference signal, a signal representing the arc voltage and a mode status signal are received as inputs to a safety circuit. The current is extinguished if (i) the signal representing the arc voltage is less than the reference signal and (ii) the mode status signal indicates the torch is in the transferred arc mode.

DETAILED DESCRIPTION

Figure 1:
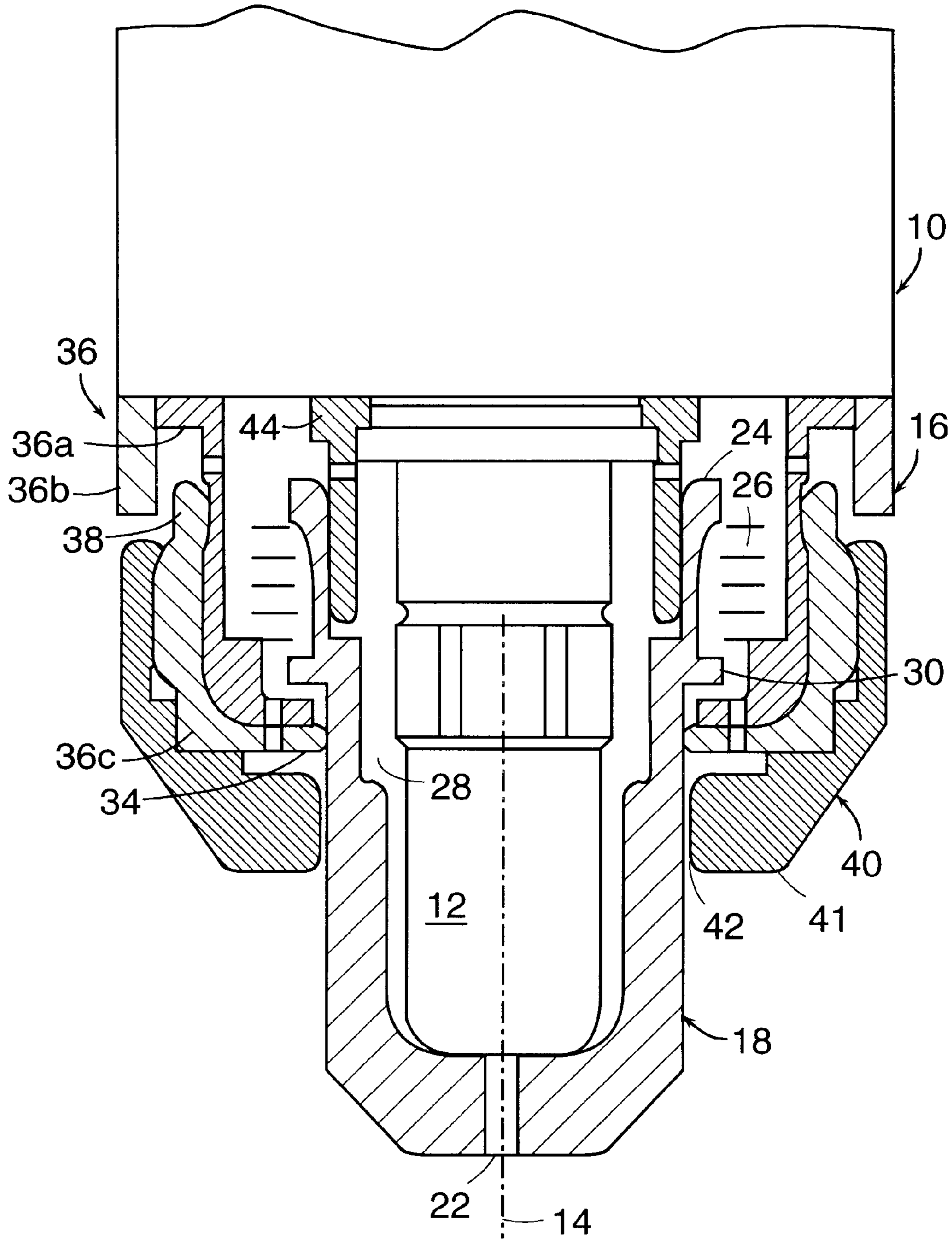
FIG. 1 is a partial cross-sectional view of the working end of a blow forward contact start plasma arc torch.

FIG. 1 is a partial cross-sectional view of the working end of a blow forward contact start plasma arc torch 10 in a de-energized mode in accordance with a first embodiment of the present invention. The term "de-energized" describes the configuration of the torch components prior to pressurization of the plasma chamber 28. The torch 10 includes a generally cylindrical body 16 and an electrode 12 which is fixedly mounted along a centrally disposed longitudinal axis 14 extending through the body 16 of the torch 10. Unless otherwise specified, the components of the torch 10 each have a respective longitudinal axis of symmetry and are assembled generally colinearly along the longitudinal axis 14 of the torch 10. The electrode 12 is isolated electrically from the torch body 16 which may serve as a handgrip for manually directed workpiece processing or as a mounting structure for use in an automated, computer controlled cutting or marking system.

A nozzle 18, disposed substantially colinearly with axis 14 and abutting the electrode 12, is translatable along axis 14 within predetermined limits. The nozzle 18 has an open end portion for receiving the electrode 12 and a closed end portion with a centrally disposed orifice 22 for discharge of high energy plasma during operation of the torch 10. The exterior of the nozzle 18 includes a radially extending flange 24 forming a reaction surface for the spring element 26.

The nozzle 18 is secured in the torch 10 by a retaining cap 36. The retaining cap 36 includes a metallic inner member 36*a* that, along with the nozzle, supports the spring element 26. The cap 36 also includes cylindrical insulating member 36*b* formed of a fiberglass reinforced resin and an L-shaped insulating member 36*c* (e.g., Vespel™) that is form fit onto the inner member 36*a*. The L-shaped insulating member 36*c* has a threaded outer surface that engages a deflector 40 formed of thermally conductive material. The lower end 41 of the deflector 40 protects the L-shaped insulating member 36*c* from splattered molten metal. Also, the lower end 41 of the deflector 40 includes an extended radial surface 42 having a small clearance relative to the nozzle 18 and serving as a heat exchanger for the nozzle 18.

The interior configuration of the nozzle 18 is sized to provide radial clearance when disposed proximate the electrode 12, forming the plasma chamber 28 therebetween. A controlled source of pressurized gas (not shown) in fluid communication with the chamber 28 provides the requisite gas to be converted into a high energy plasma for workpiece processing. A swirl ring 44 is disposed between the nozzle 18 and electrode 12 to channel the gas flow into plasma chamber 28 at the desired flow rate and angular orientation. The pressurized gas in the chamber 28 also reacts against the biasing effect of the spring element 26 to translate the nozzle 18 away from the electrode 12 during initiation of the pilot arc.

To start the torch 10, a low level electrical current is provided serially through the electrode 12 and abutting nozzle 18. Thereafter, gas is provided to the plasma chamber 28 having sufficient flow rate and pressure to overcome the bias of spring element 26, resulting in a pilot arc condition upon separation of the electrode 12 and nozzle 18. The nozzle 18 then moves in a downward direction, providing axial clearance relative to the electrode 12. Translation of the nozzle 18 is limited by abutment of the nozzle collar flange 30 with a radial step 34 of the L-shaped insulating member 36. The nozzle 18 remains displaced during operation of the torch 10 in both pilot arc and transferred arc modes. Upon shutdown of the torch 10, the flow of gas to plasma chamber 28 is terminated. As the pressure in chamber 28 decreases, the spring element force becomes dominant and the nozzle 18 translates upward into abutting relation with the electrode 12.

Figure 2:
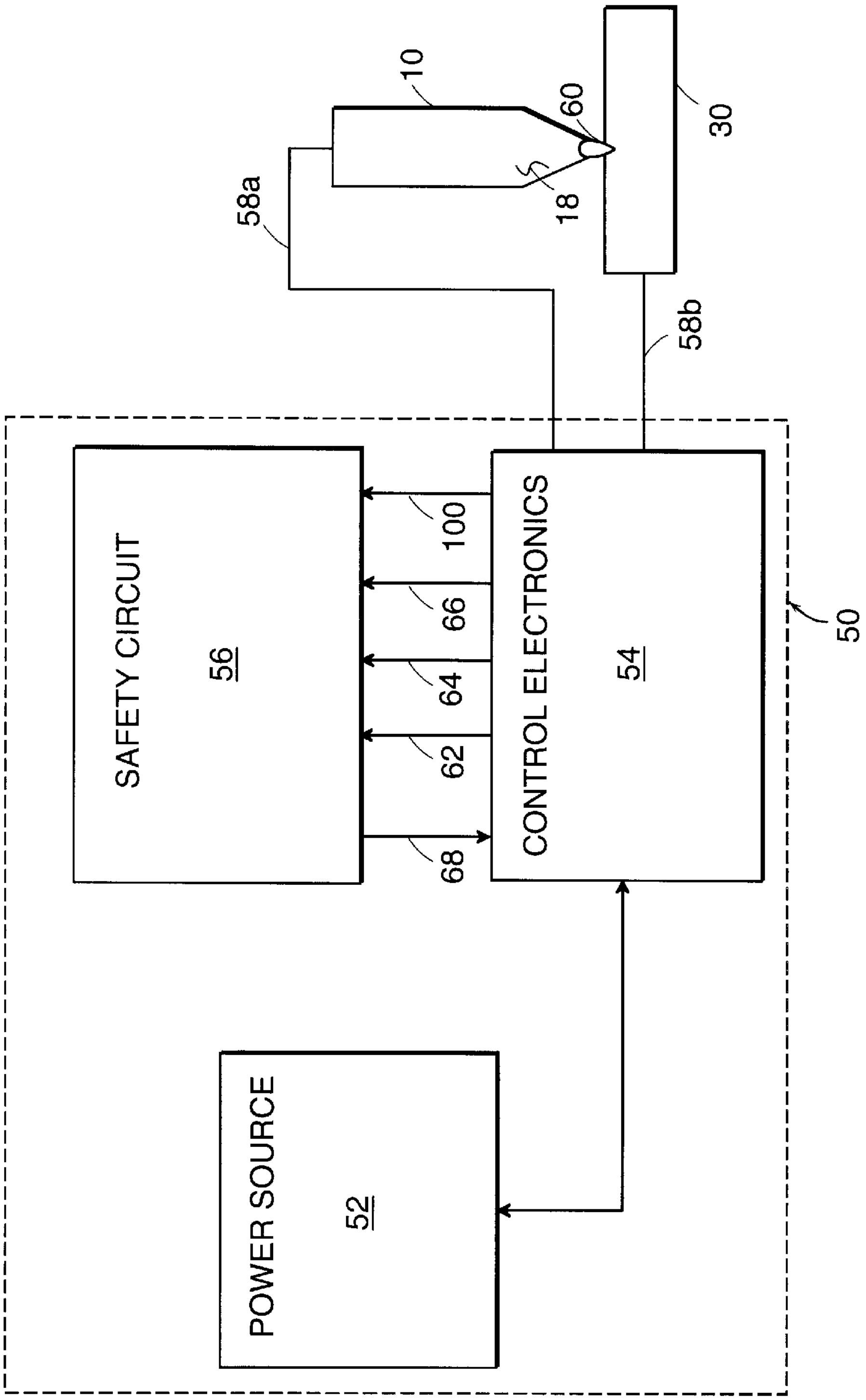
FIG. 2 is a block diagram of the blow forward contact start plasma arc torch shown in FIG. 1 including a power supply and a torch interconnected by a lead set.

FIG. 2 is a block diagram of a blow forward contact start plasma arc torch. The torch includes a torch body 10 and a power supply 50. The power supply 50 includes a power source 52, control electronics 54 and a safety circuit 56. The power source 52 can include conditioning electronics for operation with external power sources or an energy storage device (e.g., a battery). The control electronics 54 includes power electronics and electrically couples the electrode 12, nozzle 18 and workpiece 30 to the power supply 50 through leads 58. Additionally, the control electronics 54 regulates the current for maintaining the plasma arc 60 during transferred arc mode and pilot arc mode operation.

The safety circuit 56 receives a reference voltage 62, a signal indicative of the arc voltage 64, a mode indication voltage 66, and a RESET signal 100 from the control electronics 54. The safety circuit 56 processes these signals to determine if an unsafe condition exists (i.e., the nozzle 18 is in contact with the electrode 12 during operation of the torch in the transferred arc mode).

The reference voltage 62 is a constant value that represents the voltage between the electrode 12 and the workpiece 30. More specifically, the reference voltage 62 represents a voltage (e.g., 50 V) that is several volts less than the transferred arc voltage (e.g., 90 V to 270 V), which is measured between the electrode 12 and the workpiece 30. Also, the reference voltage 62 represents a voltage that is greater than the arc voltage when the nozzle 18 has contacted the workpiece 30 with sufficient force to result in electrical contact between the nozzle 18 and the electrode 12 (e.g., <10 V).

The signal indicative of the arc voltage 64 is a voltage that is linearly proportional to the actual transferred arc voltage and is generated by an error amplifier (not shown) within the control electronics 54. The mode indication voltage 66 indicates whether the torch is in pilot arc mode (LOW) or transferred arc mode (HMGH). The mode indication voltage 66 is received from the control electronics 54.

The safety circuit 56 provides a control signal 68 to the control electronics 54 for terminating the torch current during the unsafe condition based on the status of the reference signal 62, the signal indicative of the arc voltage 64 and mode indication signal 66.

Figure 3:
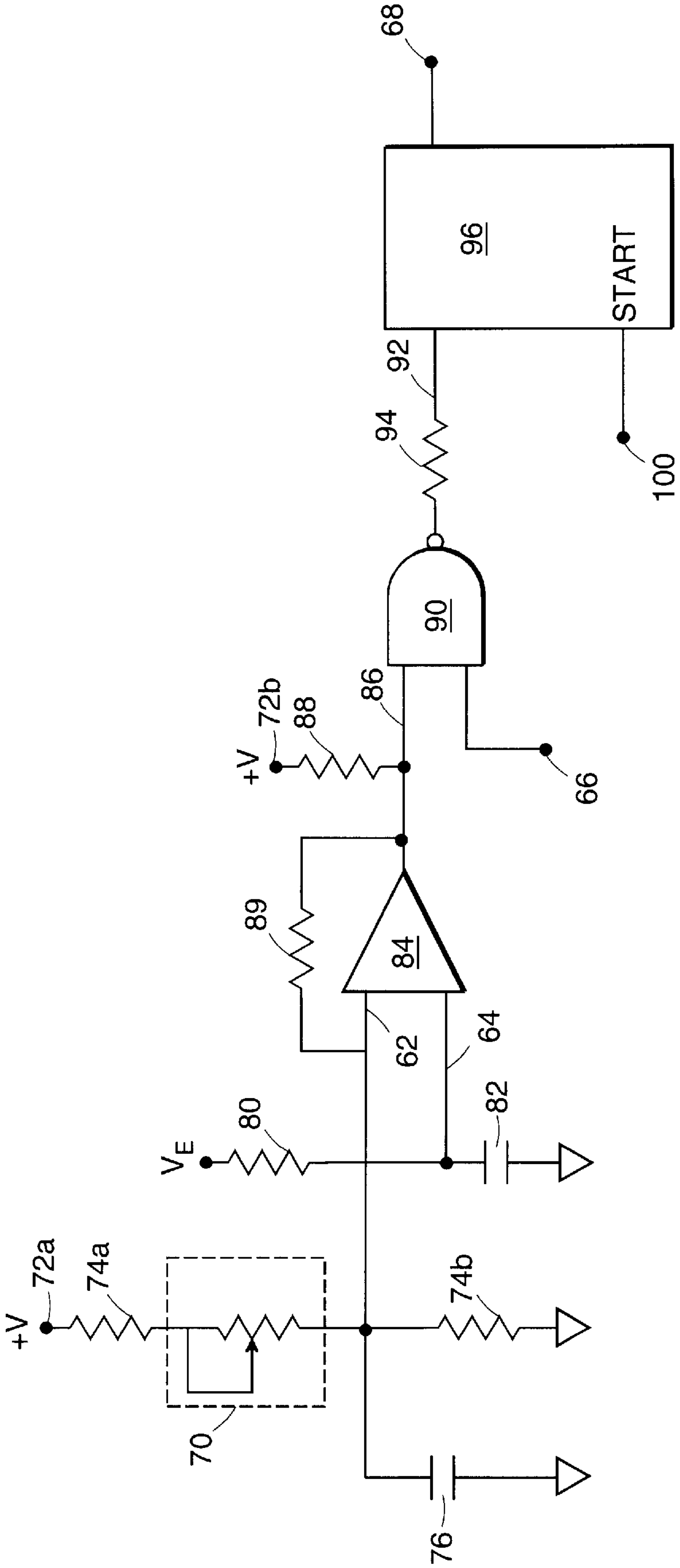
FIG. 3 is a schematic diagram of a safety circuit for use in the blow forward contact start plasma arc torch shown in FIG. 2.

FIG. 3 is a schematic diagram of a safety circuit 56 employed in the blow forward contact start plasma arc torch 10. As shown, the circuit 56 includes three basic components: a comparator 84; a logic device 90; and a control device 96. The reference voltage 62 and the signal indicative of the arc voltage 64 are inputs to the comparator 84. The voltage for the reference signal 62 can be set by adjusting a potentiometer 70. The potentiometer is part of a voltage divider network including: potentiometer 70; voltage source 72; and resistors 74*a*, 74*b*. Capacitor 76 attenuates high frequency noise in the reference signal 62. As noted previously, the signal indicative of the arc voltage 64 is a voltage that is linearly proportional to the actual transferred arc voltage and is generated by an error amplifier (not shown). A resistor 80 and capacitor 82 attenuate high frequency noise in the signal indicative of the arc voltage 64.

The comparator 84 compares the reference voltage 62 with the signal indicative of the arc voltage 64 and generates a comparator output voltage 86. The comparator output voltage 86 is HIGH when the signal indicative of the arc voltage 64 is less than the reference voltage 62. A resistor 88 is used in conjunction with voltage source 72 to set the range of the comparator output voltage 86. A feedback resistor 89 is used to define the hystersis of the comparator 84.

The logic device 90 (e.g., a NAND gate) receives the comparator output voltage 86 and the mode indication signal 66, and generates an output voltage 92. When both the comparator output voltage 86 and mode indication signal 66 are HIGH, the output voltage 92 is LOW. A resistor 94 is used for test and calibration.

A control device 96 (e.g., a flip-flop) receives the output 92 of the NAND gate 90 and generates a control device output 68 for the control electronics 54. If the NAND gate output 92 is LOW, then the control device output 68 latches LOW. Upon receiving the LOW signal from the control device 96, the control electronics 54 extinguishes the torch current and sets the mode indication signal 66 to a LOW state indicating pilot arc mode. While the change in state of the mode indication signal 66 causes the NAND gate 90 to change to a HIGH state, the control device output 68 remains latched LOW until it receives a LOW signal from the RESET signal 100. The RESET signal 100 can be generated by a switch (not shown) on the torch body 10. An operator holds the switch closed during operation of the torch and releases the switch after the safety circuit has extinguished the torch current. Upon release of the switch, the RESET signal 100 goes LOW and the control device output 68 is no longer latched LOW.

Equivalents

While the invention has been particularly shown and described with reference to specific preferred embodiments, it should be understood by those skilled in the art that various changes in form and detail may be made therein without departing from the spirit and scope of the invention as defined by the appended claims.

We claim:

1. A contact start plasma arc torch, comprising:

a torch body;

an electrode having a longitudinally disposed axis and mounted in the body;

a translatable nozzle having a longitudinally disposed axis, the nozzle axis being disposed substantially colinearly with the electrode axis;

a power supply electrically coupled to the electrode, the nozzle and a workpiece, the power supply providing a current for operating the torch in a pilot arc mode or a transferred arc mode; and a safety circuit receiving a reference signal, a signal indicative of the arc voltage and a mode status signal, the safety circuit terminating the current when the signal indicative of the arc voltage is less than the reference signal and the mode status signal indicates the torch is operating in the transferred arc mode.

2. The torch of claim 1 wherein the reference signal, the signal indicative of the arc voltage and the mode status signal are voltages.

3. The torch of claim 1 wherein the safety circuit comprises a comparator for comparing the arc signal and reference signal.

4. The torch of claim 3 further comprising a logic device electrically connected to the comparator and generating a logic device output signal when the signal indicative of the arc voltage is less than the reference signal and the mode status signal indicates the torch is operating in the transferred arc mode.

5. The torch of claim 4 further comprising a control device receiving the logic device output, the control device generating a control output signal when the logic device output signal is present.

6. The torch of claim 5 wherein the control device is a flip-flop.

7. The torch of claim 1 wherein the signal indicative of the arc voltage is linearly proportional to the arc voltage.

8. The contact start plasma arc torch of claim 1 further comprising a spring element disposed in the torch and reacting against the nozzle for compliantly biasing the nozzle in direction of contact with the electrode.

9. The contact start plasma arc torch of claim 8 wherein the nozzle and the spring element form an integral assembly.

10. A contact start plasma arc torch, comprising:

a torch body;

an electrode having a longitudinally disposed axis and mounted in the body;

a translatable nozzle having a longitudinally disposed axis, the nozzle axis being disposed substantially colinearly with the electrode axis;

a spring element disposed in the torch and reacting against the nozzle for compliantly biasing the nozzle in direction of contact with the electrode;

a power supply electrically coupled to the electrode, nozzle, and a workpiece, the power supply providing a current for operating the torch in a pilot arc mode or a transferred arc mode;

a comparator electrically coupled to the power supply and receiving a signal indicative of the arc voltage and a reference signal, the comparator providing a comparator output signal when the signal indicative of the arc voltage is less than the reference signal;

a logic device receiving a mode indication signal and the comparator output signal, the logic device generating a logic device output signal having a first state when the mode indication signal has a first state indicating the torch is in the transferred arc mode and the comparator output signal indicates the signal indicative of the arc voltage is less than the reference signal; and a control device receiving the logic device output signal, the control device generating a control signal having a first state for terminating the current when the logic device output signal is present.

11. The torch of claim 10 wherein the signal indicative of the arc voltage is linearly proportional to the arc voltage.

12. The torch of claim 10 further comprising control electronics.

13. The torch of claim 12 wherein the control electronics receives the control signal for terminating the current, the control electronics setting the mode indication signal to a second state indicating the torch is in the pilot arc mode.

14. The torch of claim 13 wherein the logic device receives the mode indication signal indicating the torch is in the pilot arc mode and sets the logic device output to a second state.

15. The torch of claim 14 wherein the control device receives a reset signal from the control electronics and sets the control signal to a second state thereby enabling the power supply to provide the current for operating the torch.

16. A safety circuit for a contact start plasma arc torch in which the torch comprises a torch body, an electrode having a longitudinally disposed axis, the nozzle axis being disposed substantially colinearly with the electrode axis, a spring element disposed in the torch and reacting against the nozzle for compliantly biasing the nozzle in the direction of contact with the electrode, and a power supply electrically coupled to the electrode, the nozzle and a workpiece, the power supply providing a current for operating the torch in a pilot arc mode or a transferred arc mode, the circuit comprising:

a comparator electrically coupled to the power supply and receiving a signal indicative of the arc voltage and a reference signal, the comparator providing a comparator output signal when the signal indicative of the arc voltage is less than the reference signal;

a logic device receiving a mode indication signal and the comparator output signal, the logic device generating a logic device output signal having a first state when the mode indication signal has a first state indicating the torch is in the transferred arc mode and the comparator output signal indicates the signal indicative of the arc voltage is less than the reference signal; and a control device receiving the logic device output signal, the control device generating a control signal having a first state for terminating the current when the logic device output signal is present.

17. A method for safe operation of a contact start plasma arc torch, comprising:

providing a contact start plasma arc torch having an electrode and a translatable nozzle disposed in a torch body;

supplying electrical power to torch for operation in a pilot arc mode or a transferred arc mode;

receiving as inputs to a safety circuit, a reference signal, a signal indicative of the arc voltage and a mode status signal; and terminating the current when the signal indicative of the arc voltage is less than the reference signal and the mode status signal indicates the torch is operating in the transferred arc mode.

18. The method of claim 17 further comprising the step of receiving in a comparator the reference signal and the signal indicative of the arc voltage, the comparator providing a comparator output signal when the signal indicative of the arc voltage is less than the reference signal.

19. The method of claim 18 further comprising the step of receiving in a logic device the mode indication signal and the comparator output signal, the logic device generating a logic device output signal when the mode indication signal indicates that the torch is in the transferred arc mode and the comparator output signal indicates the signal indicative of the arc voltage is less than the reference signal.

20. The method of claim 19 further comprising the step of receiving in a control device the logic device output signal, the control device generating a control signal for terminating the current when the logic device output signal is present.

* * * * *